United States Patent
Kasibhatla et al.

(10) Patent No.: US 11,777,952 B2
(45) Date of Patent: Oct. 3, 2023

(54) TRACKING AND SECURING ELECTRONIC MESSAGES USING AN EMBEDDED IDENTIFIER

(71) Applicant: CA, Inc., New York, NY (US)

(72) Inventors: Krishna Chaithanya Kasibhatla, Telanganda (IN); Satish Kumar Sharaf, Telanganda (IN)

(73) Assignee: CA, Inc., San Jose, CA (US)

( * ) Notice: Subject to any disclaimer, the term of this patent is extended or adjusted under 35 U.S.C. 154(b) by 1393 days.

(21) Appl. No.: 16/157,348

(22) Filed: Oct. 11, 2018

(65) Prior Publication Data
US 2020/0120106 A1    Apr. 16, 2020

(51) Int. Cl.
H04L 9/40        (2022.01)

(52) U.S. Cl.
CPC ........ H04L 63/126 (2013.01); H04L 63/0428 (2013.01); H04L 63/0876 (2013.01); H04L 63/102 (2013.01)

(58) Field of Classification Search
CPC .................................................. H04L 63/126
See application file for complete search history.

(56) References Cited

U.S. PATENT DOCUMENTS

| | | | | |
|---|---|---|---|---|
| 5,859,967 A * | 1/1999 | Kaufeld | ............... | G06Q 10/107 709/200 |
| 6,757,826 B1 * | 6/2004 | Paltenghe | .............. | G06Q 30/06 713/176 |
| 7,120,927 B1 * | 10/2006 | Beyda | ................... | H04L 51/212 713/153 |
| 7,376,706 B2 * | 5/2008 | Goguen | .................. | H04L 51/00 709/229 |
| 7,961,879 B1 * | 6/2011 | Spies | .................... | H04L 9/3073 380/44 |
| 9,654,492 B2 * | 5/2017 | Maylor | ................... | H04L 63/08 |
| 2008/0133672 A1 * | 6/2008 | Gillum | ................ | G06Q 10/107 709/206 |
| 2009/0138711 A1 * | 5/2009 | Heimbigner | ......... | H04L 51/212 713/176 |
| 2014/0289644 A1 * | 9/2014 | Clarke | .................... | G06F 3/048 715/752 |

(Continued)

FOREIGN PATENT DOCUMENTS

JP       2005303389       * 10/2005

*Primary Examiner* — Bruce S Ashley
(74) *Attorney, Agent, or Firm* — Quarles & Brady LLP

(57) ABSTRACT

An authentication server can receive an electronic message transmitted by a sender. The electronic message can have an intended recipient and can include message data. A sender identification ("ID") is embedded in the message data. The authentication server can generate a first message ID based on the message data that includes the sender ID. The first message ID can be determined to match a second message ID that is stored in a database. The sender ID can be determined to be different from an originator ID that is associated with the second message ID in the database. The authentication server can determine whether an originator associated with the originator ID has authorized the sender to transmit the message data and can determine whether to transmit the electronic message to the intended recipient based on whether the originator has authorized the sender to transmit the data.

16 Claims, 6 Drawing Sheets

(56) References Cited

U.S. PATENT DOCUMENTS

2015/0264022 A1* 9/2015 Manvi .................... H04L 51/34
                                                              726/3
2015/0358260 A1* 12/2015 Jordan .................. H04L 51/214
                                                              709/206

* cited by examiner

US 11,777,952 B2

TRACKING AND SECURING ELECTRONIC MESSAGES USING AN EMBEDDED IDENTIFIER

TECHNICAL FIELD

The present disclosure relates to computing systems, and, in particular, to a computer system for tracking and securing electronic messages using an embedded identifier.

BACKGROUND

Electronic messages (e.g., emails and text messages) have become a universal form of communication in both our personal lives and the business world. But, the ease in copying and forwarding electronic messages can make tracking and securing electronic messages difficult. As a result, electronic messages have become a common cause for the spread of malicious information as well as malicious software. It may not be possible to determine the originator of a malicious electronic message or to determine a path the malicious electronic message has taken. Furthermore, senders may have no control over the data they send via electronic messages and recipients can misuse received messages. For example, a recipient may forward an electronic message that a sender intended to be a private communication, or a recipient may copy data included in an electronic message and claim ownership of the data.

SUMMARY

Some embodiments disclosed herein are directed to a method for tracking and securing electronic messages. The method includes receiving, by a communication interface of an authentication server, an electronic message transmitted by a sender. The electronic message can have an intended recipient and can include message data. The sender identification ("ID") can be embedded in the message data. The method can further include generating, by a processing circuit of the authentication server, a first message ID based on the message data that includes the sender ID embedded therein. The processing circuit can determine that the first message ID matches a second message ID that is stored in a database. The processing circuit can further determine that the sender ID is different from an originator ID that is associated with the second message ID in the database. The processing circuit can further determine whether an originator associated with the originator ID has authorized the sender to transmit the message data. The processing circuit can further determine whether to transmit the electronic message to the intended recipient based on whether the originator has authorized the sender to transmit the data.

Corresponding operations by computer program products and electronic devices are disclosed. Other methods, computer program products, and electronic devices according to embodiments will be or become apparent to one with skill in the art upon review of the following drawings and detailed description. It is intended that all such additional methods, computer program products, and electronic devices be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
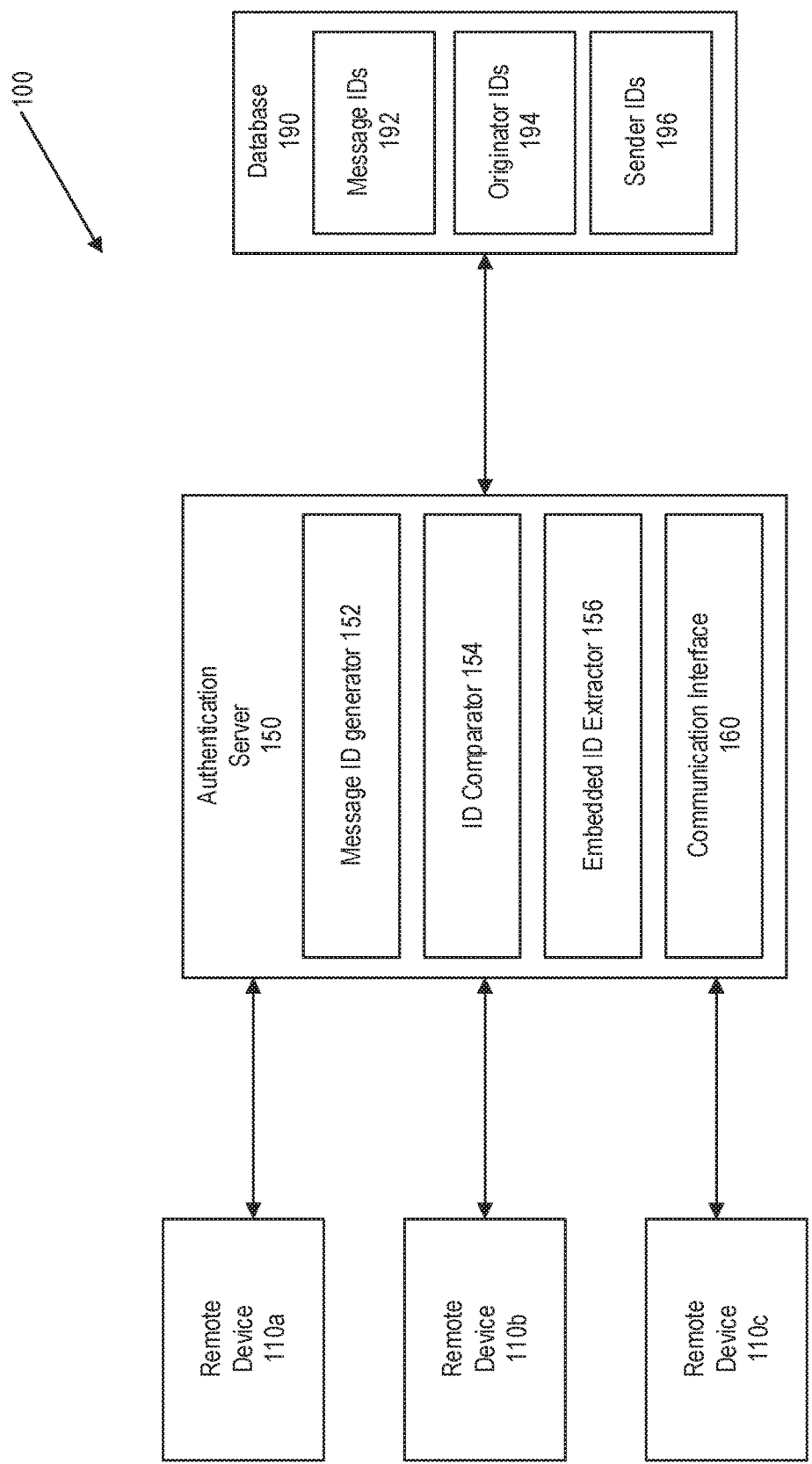
FIG. 1 is a block diagram of an example of a system for tracking and securing electronic messages using an embedded identifier in accordance with some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components, and circuits have not been described in detail so as not to obscure the present invention. It is intended that all embodiments disclosed herein can be implemented separately or combined in any way and/or combination.

As explained above, electronic messages have become a universal form of communication, but the ease in copying and forwarding electronic messages can make tracking and securing electronic messages difficult.

Various embodiments of the present disclosure are directed to tracking and securing electronic messages using an embedded identifier. In some embodiments, an authentication server can be positioned in a communication path between two remote devices. The authentication server can assign each remote device a unique identification ("ID") based on a user associated with the remote device. When one of the remote devices attempts to transmit an electronic message, the remote device can embed the unique ID in the message data associated with the electronic message. The embedded unique ID can be considered a sender ID since it identifies a sender of the electronic message. The authentication server can receive the electronic message and determine a message ID for the electronic message based on the message data that identifies the electronic message. The authentication server can check a database for the message ID.

In response to not finding the message ID, the authentication server can store the message ID and the sender ID in the database. The sender ID can be stored as the originator ID for the electronic message indicating that the user associated with the electronic message and the sender ID is the originator of the message data in the electronic message. Furthermore, the authentication server can allow the electronic message to be transmitted to a receiving device.

In response to finding a matching message ID in the database, the authentication server can compare the sender ID embedded in the message data with an originator ID associated with the matching message ID. If the sender ID and the originator ID match then the authentication server can determine that the electronic message is being retransmitted by the originator and the authentication server can allow the electronic message to be transmitted to a receiving device. If the sender ID and the originator ID fail to match then the authentication server can determine that the electronic message is being retransmitted by an entity other than the originator. The authentication server can contact the originator and determine whether to transmit the electronic message to a receiving device based on a response from the originator.

In some embodiments, using electronic messages with embedded identifiers, can lessen the effects of malicious electronic messages and allow effected users to be notified. In some examples, the originator ID associated with the user that transmitted the malicious electronic message can be recorded, and the originator ID may be embedded in the message data of every iteration of the malicious electronic message. The originator ID may be used by law enforcement to identify or locate the user acting as a malicious entity. In additional or alternative examples, a path of a malicious electronic message with an embedded identifier can be tracked. Sender IDs and recipient IDs can be stored each time the malicious electronic message is transmitted. The sender IDs and recipient IDs can be used to contact users and inform them of steps to mitigate damage from the malicious electronic messages.

In additional or alternative embodiments, using electronic messages with embedded identifiers, can allow originators of electronic message data to have greater control and knowledge over the spread of their message data. In some examples, an originator can indicate that their electronic message data is not to be forwarded, can only be forwarded with authorization from the originator, can only be forwarded by selected users, or that a notification should be sent to the originator whenever the message data is forwarded.

FIG. 1 depicts a system 100 for tracking and securing electronic messages using an embedded identifier in accordance with some embodiments of the present disclosure. In this example, system 100 includes an authentication server 150 communicatively coupled to a database 190 and remote devices 110a-c.

The authentication server 150 includes a message ID generator 152, an ID comparator 154, an embedded ID extractor 156, and a communication interface 160. The communication interface 160 can communicatively couple the authentication server 150 to the remote devices 110a-c and the database 190. In some embodiments, the authentication server 150 can receive, via the communication interface 160, electronic messages from the remote devices 110a-c.

The message ID generator 152 can determine a message ID from message data included in an electronic message received via the communication interface 160. The ID comparator 154 can compare a message ID output by the message ID generator 152 with another message ID obtained, via communication interface 160 from the database 190. In some examples, the ID comparator 154 does not find a matching message ID in the database 190 and the authentication server 150 can determine that the message data is original or above a threshold level of originality.

In response to determining that the message data is original, the authentication server 150 can determine that the sender of the electronic message is the originator of the electronic message. The authentication server 150 can store a copy of the message ID in the database 190 and store the sender ID as an originator ID associated with the message ID. Storing the message ID in the database 190 can allow the authentication server to detect if one of the remote devices 110a-c tries to transmit the message data in another electronic message. For example, subsequent transmission of the message data in a second electronic message can result in the ID comparator 154 finding a match between a message ID generated in the second electronic message and the message ID stored in the database 190.

Storing the sender ID as an originator ID in the database 190 can allow the authentication server to detect if the remote device 110a-c that tries to transmit the message data is the originator. For example, if the ID comparator 154 finds a matching message ID in the database 190, the embedded ID extractor 156 can determine a sender ID from the message data included in the electronic message. The ID comparator 154 can further compare the sender ID output by the embedded ID extractor 156 with a sender ID associated with a message ID stored in the database 190. If the ID comparator 154 finds a match, the authentication server 150 can determine that the remote device that is transmitting the message data is associated with the originator and the authentication server can authorize the transmission. But, if the comparator 154 fails to find a match between the sender ID output by the embedded ID extractor 156 and the sender ID associated with the message ID stored in the database 190, the authentication server 150 can determine that the remote device 110a-c is not the originator and the authentication server 150 can require approval from the originator prior to allow the message data to be retransmitted.

The remote devices 110a-c can be any suitable device (e.g., a computer or a mobile device) for transmitting or receiving an electronic message. One of the remote devices 110a-c can be considered a sender device relative to a specific electronic message if the remote device transmits an electronic message. A sender device can be further considered an originator device relative to the specific electronic message if message data in the electronic message originated at the sender device. One of the remote devices 110a-c can be considered a receiving device relative to the specific electronic message if the remote device is an intended recipient of the specific electronic message.

In some embodiments, one of the remote devices 110a-c embeds a sender ID and a message ID in message data of an electronic message transmitted to the authentication server 150. The IDs can be embedded in the content of the message data or meta data associated with the message data. In some examples, the IDs are embedded in the message data by adjusting the color of pixels that form the content of the message data. Adjusting the color of pixels can generate a watermark that may not be visible to the human eye. In additional or alternative embodiments, the IDs may be embedded such that copying the message data into a new electronic message will also copy the IDs.

The database 190 can include interlinked directories of message IDs 192, originator IDs 194, and sender IDs 196. The message IDs 192 can be a value associated with a specific electronic message. The originator ID can be a unique identifier associated with a specific originator or originator device. The sender ID can be a unique identifier associated with a specific sender or sender device. In some examples, an entry for each of the message IDs 192 can include an originator ID associated with an originator of the message and can include one or more sender IDs associated with other senders of the message data.

Although FIG. 1 depicts system 100 with the database 190 separate and independent from the authentication server 150, other implementations are possible. In some embodiments, an authentication server for tracking and securing electronic messages using embedded identifiers includes a database. In additional or alternative embodiments, the database 190 can store a copy of the message data. In additional or alternative embodiments, the database 190 can store permission data associated with each message ID indicating what the originator permits regarding use of the message data. For example, the permission data may indicate that the associated message data can be forwarded as long as the originator associated with the message data is credited as the source of the message data, as long as the message data is unchanged, or as long as the originator is a recipient of the electronic message with the message data.

Although the present disclosure generally describes a sender ID being embedded in message data of an electronic message by a sending device, other implementations are possible. In some embodiments, the authentication server 150 can, in response to determining that a message ID associated with the message data does not match an existing message ID in the database 190 and prior to allowing the electronic message to be forwarded to a receiving device, embed the originator ID in the message data. The authentication server 150 can receive a subsequent electronic message with the message data, extract the originator ID from the message data, and compare information associated with the originator ID to information associated with the source of the subsequent electronic message.

Figure 2:
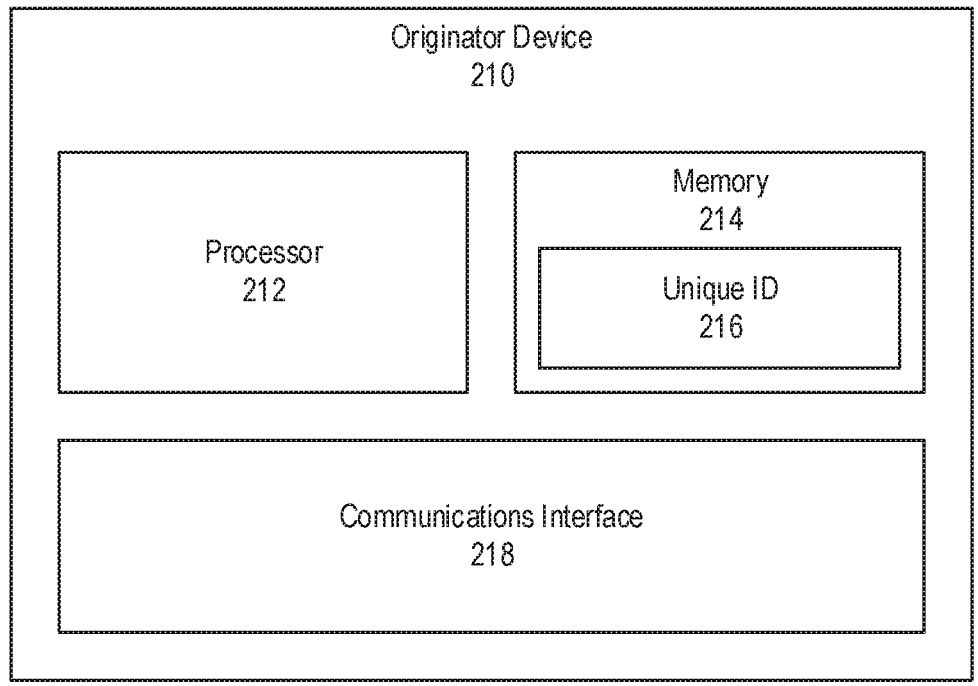
FIG. 2 is a block diagram of an example of an originator device for transmitting an electronic message including original data an embedded originator ID in accordance with some embodiments of the present disclosure.

FIG. 2 depicts an example of an originator device 210 for transmitting an electronic message including original data and an embedded originator ID in accordance with some embodiments of the present disclosure. In some embodiments, the originator device 210 can be an example of one of remote devices 110a-c relative to message data in an electronic message. In this example, the originator device 210 includes a processor 212, memory 214, and a communication interface 218.

The processor 212 may include one or more data processing circuits, such as a general purpose and/or special purpose processor (e.g., microprocessor and/or digital signal processor) that may be collocated within the originator device 210 or distributed across one or more networks. The processor 212 is configured to execute computer program code in the memory 214, described below as non-transitory computer readable medium, to perform at least some of the operations described herein as being performed by the originator device 210 or any component thereof.

The originator device 210 may be assigned a unique ID 216, which can be stored in memory 214. In some embodiments, the unique ID 216 is assigned to the originator device 210 based on a specific user using the originator device 210. For example, the specific user may be associated with a user account that includes one or more unique IDs and the unique ID 216 may be assigned to the originator device 210 in response to the user accessing the user account on the originator device 210.

The communication interface 218 may be a wired network interface transceiver, e.g., Ethernet, and/or a wireless radio frequency transceiver that is configured to operate according to one or more communication protocols, e.g., WiFi, Bluetooth, cellular, LTE, etc.

In some embodiments, originator device 210 includes a user interface that allows a user to provide the processor with original message data and an intended recipient. In additional or alternative embodiments, the processor 212 embeds the unique ID 216 in the message data and forms an electronic message using the message data including the embedded unique ID 216. Processor 212 transmits, via communication interface 218, the electronic message to an authentication server for authentication and transmission to the intended recipient. The unique ID 216 can be considered an originator ID in relation to the original message data and the unique ID 216 may be stored as an originator ID by the authentication server.

In additional or alternative embodiments, processor 212 can receive, via communication interface 218, an authorization request from the authentication server. The authorization request can indicate that a remote device or sender device is attempting to transmit an electronic message that includes message data that is within a threshold level of similarity to the original message data. In some examples, the authorization request includes a copy of the electronic message and identification of intended recipients of the electronic message. The processor 212 can transmit, via communication interface 218, a response to the authentication request that allows or prevents the transmission of the electronic message. In some embodiments, the processor 212 can transmit, via communication interface 218, permission data to the authentication server that indicates limitations on how the original message data can be retransmitted.

Figure 3:
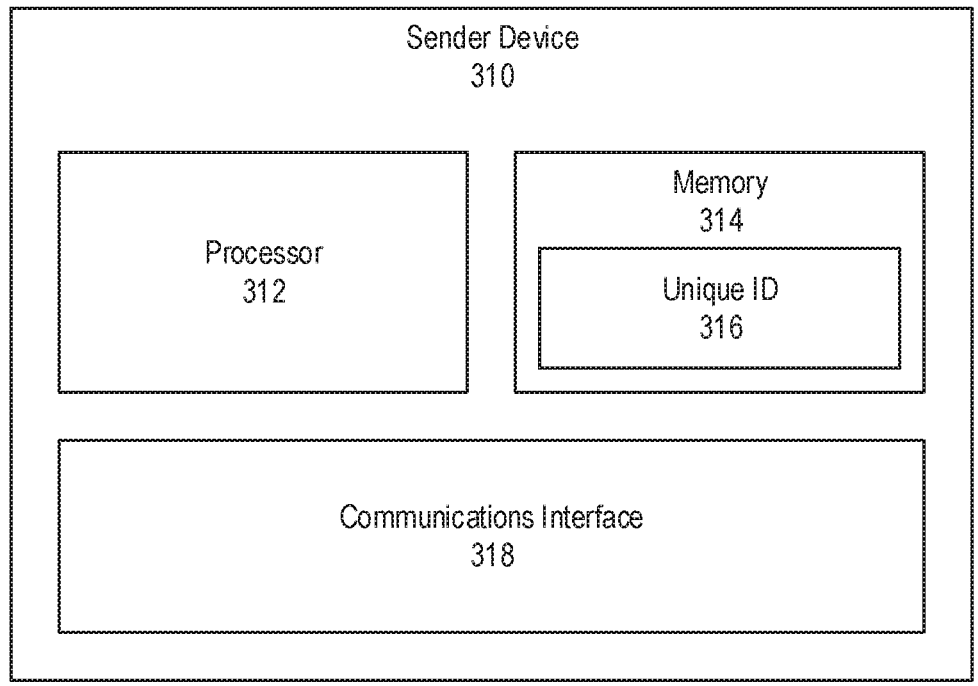
FIG. 3 is a block diagram of an example of a sender device for transmitting an electronic message including copied data and an embedded sender ID in accordance with some embodiments of the present disclosure.

FIG. 3 depicts an example of a sender device 310 for transmitting an electronic message including copied data and an embedded sender ID in accordance with some embodiments of the present disclosure. In some embodiments, the originator device 310 can be an example of one of remote devices 110a-c relative to message data in an electronic message. In this example, the sender device 310 includes a processor 312, memory 314, and a communication interface 318.

The processor 312 may include one or more data processing circuits, such as a general purpose and/or special purpose processor (e.g., microprocessor and/or digital signal processor) that may be collocated within the sender device 310 or distributed across one or more networks. The processor 312 is configured to execute computer program code in the memory 314, described below as non-transitory computer readable medium, to perform at least some of the operations described herein as being performed by the sender device 310 or any component thereof.

The sender device 310 may be assigned a unique ID 316, which can be stored in memory 314. In some embodiments, the unique ID 316 is assigned to the sender device 310 based on a specific user using the sender device 310. For example, the specific user may be associated with a user account that includes one or more unique IDs and the unique ID 316 may be assigned to the sender device 310 in response to the user accessing the user account on the sender device 310.

The communication interface 318 may be a wired network interface transceiver, e.g., Ethernet, and/or a wireless radio frequency transceiver that is configured to operate according to one or more communication protocols, e.g., WiFi, Bluetooth, cellular, LTE, etc.

In some embodiments, sender device 310 includes a user interface that allows a user to provide the processor with unoriginal electronic message data and an intended recipient. In additional or alternative embodiments, the processor 312 embeds the unique ID 316 in the unoriginal message data and forms an electronic message using the unoriginal message data including the embedded unique ID 316. The unique ID 316 may be considered a sender ID relative to the unoriginal message data since. Processor 312 transmits, via communication interface 318, the electronic message to an authentication server for authentication and transmission to the intended recipient. In some embodiments, processor 312 receives, via communication interface 318, indication that the electronic message was rejected for lacking authorization to retransmit the unoriginal message data.

Figure 4:
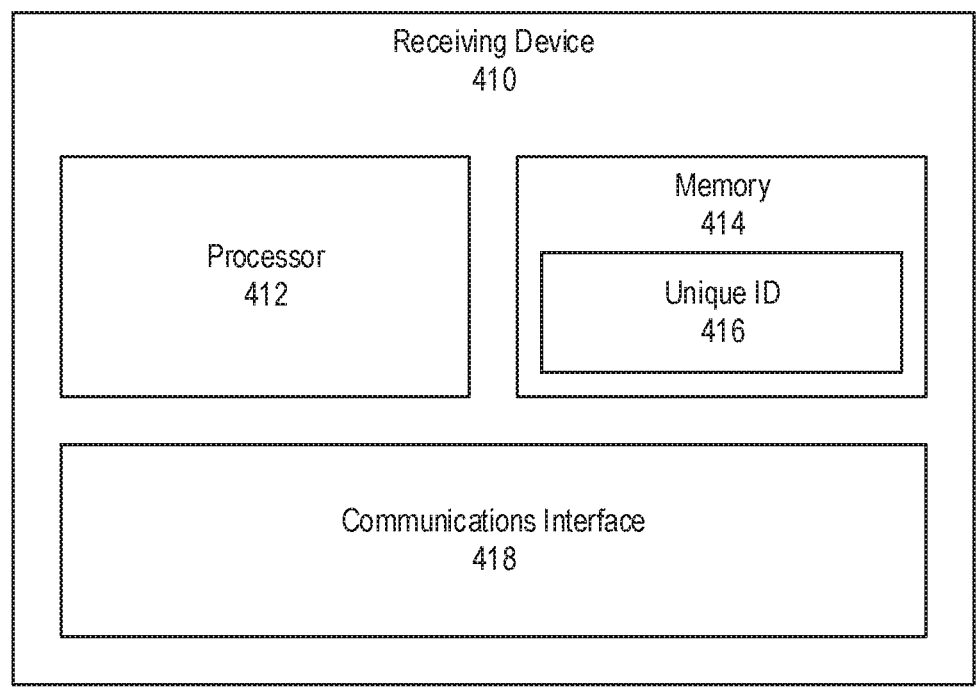
FIG. 4 is a block diagram of an example of a receiving device for receiving an electronic message in accordance with some embodiments of the present disclosure.

FIG. 4 depicts a block diagram of an example of a receiving device 410 for receiving an electronic message in accordance with some embodiments of the present disclosure. In some embodiments, the receiving device 410 is an example of one of the remote devices 110a-c in FIG. 1. In this example, the originator device 210 includes a processor 412, memory 414, and a communication interface 418.

The processor 412 may include one or more data processing circuits, such as a general purpose and/or special purpose processor (e.g., microprocessor and/or digital signal processor) that may be collocated within the receiving device 410 or distributed across one or more networks. The processor 412 is configured to execute computer program code in the memory 414, described below as non-transitory computer readable medium, to perform at least some of the operations described herein as being performed by the receiving device 410 or any component thereof.

The receiving device 410 may be assigned a unique ID 416, which can be stored in memory 414. In some embodiments, the unique ID 416 is assigned to the receiving device 410 based on a specific user using the receiving device 410. For example, the specific user may be associated with a user account that includes one or more unique IDs and the unique ID 416 may be assigned to the receiving device 410 in response to the user accessing the user account on the receiving device 410.

The communication interface 418 may be a wired network interface transceiver, e.g., Ethernet, and/or a wireless radio frequency transceiver that is configured to operate according to one or more communication protocols, e.g., WiFi, Bluetooth, cellular, LTE, etc.

In some embodiments, processor 412 receives, via communication interface 418, an electronic message from an originator device or a sender device after authentication by an authentication server. In some examples, receiving device 410 includes a user interface for displaying message data included in the electronic message. In additional or alternative embodiments, processor 412 receives, via communication interface 418, a notification from the authentication server. In some examples, the notification can include a warning identifying the message data as malicious data.

Figure 5:
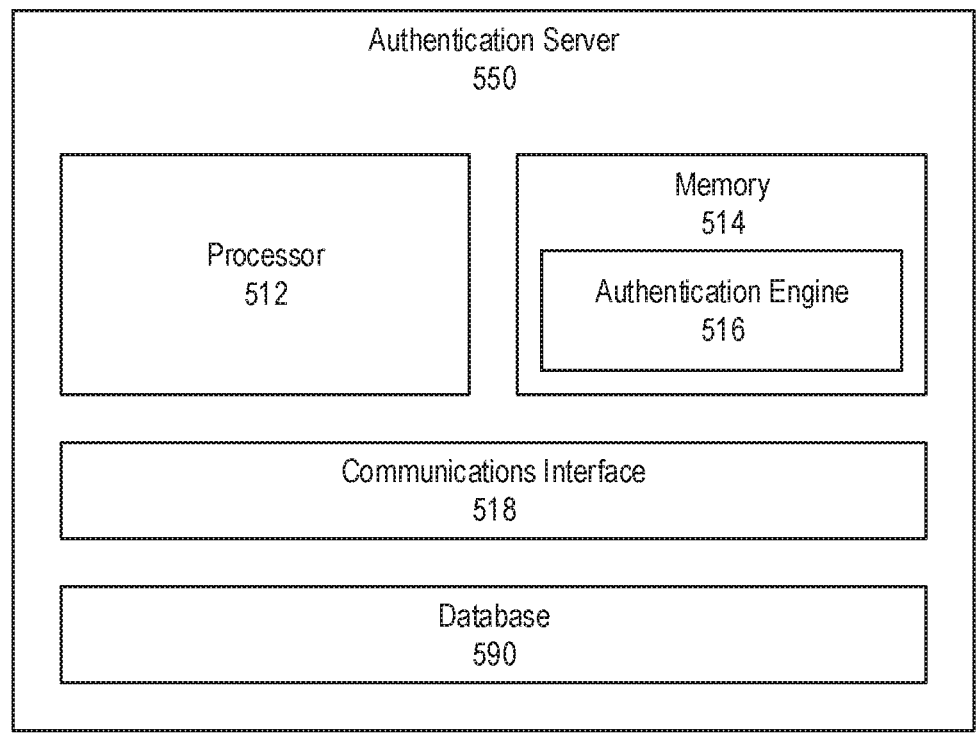
FIG. 5 is a block diagram of an example of an authentication server for tracking and authenticating electronic messages using an embedder identifier in accordance with some embodiments of the present disclosure.

FIG. 5 depicts an example of an authentication server 550 for tracking and authenticating electronic messages using an embedder identifier in accordance with some embodiments of the present disclosure. In some embodiments, authentication server 550 is an example of authentication server 150 in FIG. 1. In this example, the authentication server 550 includes a processor 512, memory 514, a database 590, and a communication interface 518.

The processor 512 may include one or more data processing circuits, such as a general purpose and/or special purpose processor (e.g., microprocessor and/or digital signal processor) that may be collocated within the authentication server 550 or distributed across one or more networks. The processor 512 is configured to execute computer program code, for example authentication engine 516, in the memory 514, described below as non-transitory computer readable medium, to perform at least some of the operations described herein as being performed by the authentication server 550 or any component thereof.

The communication interface 518 may be a wired network interface transceiver, e.g., Ethernet, and/or a wireless radio frequency transceiver that is configured to operate according to one or more communication protocols, e.g., WiFi, Bluetooth, cellular, LTE, etc.

In some embodiments, processor 512 receives, via communication interface 518, electronic messages including message data from various remote devices. Database 590 includes a storage unit for tracking the path of the message data. For example, database 590 can store message IDs, sender IDs, and recipient IDs for message data. The processor 512 can generate a message ID from message data. The message ID can uniquely identify the message data and, in some examples, the message ID can be based on the content of the message data such that superficial changes to the message data result in a substantially similar message ID. If the message ID does not match an existing message ID in the database 590, the message ID can be stored in the database 590.

The processor 512 can further determine a sender ID associated with the message. In some embodiments, the processor 512 extracts the sender ID, which is embedded in the message data. In additional or alternative embodiments, the processor determines the sender ID based on the source of the electronic message that includes the message data. The sender ID can be stored in the database 590 and linked to the message ID indicating that the user associated with the sender ID transmitted the message data associated with the message data. Storing the sender IDs can allow the authentication server 550 to map a path of the message data to different remote devices. If the message ID did not match an existing message ID in the database 590, the sender ID can be stored as an originator ID. Storing a sender ID as an originator ID can allow the authentication server 550 to limit retransmission of message data based on authorization received from the user associated with the originator ID.

The processor 512 can further store a receiving ID associated with the intended recipient in the database 590 as linked to the message ID. In some embodiments, processor 512 can retrieve the receiving IDs from the database 590 in response to determining the message ID is associated with malicious data. The processor 512 can use the receiving IDs to transmit warning notifications to users associated with the receiving IDs indicating they received malicious data.

Figure 6:
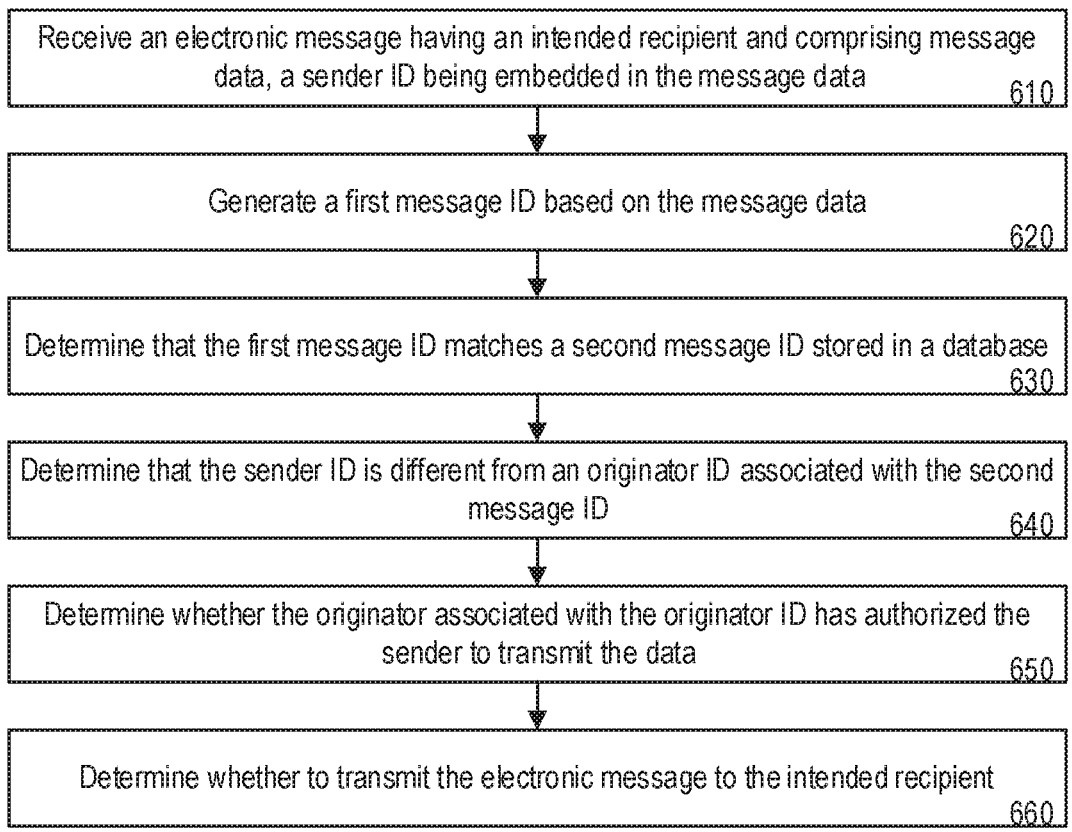
FIG. 6 is a flow chart of an example of a process for detecting that message data from an electronic message has been copied and is be retransmitted in accordance with some embodiments of the present disclosure.

FIG. 6 depicts an example of a process for detecting that message data from an electronic message has been copied and is to be retransmitted in accordance with some embodiments of the present disclosure. The process is described below in regards to the authentication server 550 in FIG. 5, but other implementations are possible.

In block 610, processor 512 receives, via communication interface 518, an electronic message having an intended recipient and including message data. The message data can include a sender ID embedded therein. In some embodiments, the electronic message is an email or a text message received from a mobile device over a telecommunications network. The sender ID may be embedded in the content of the message data. In some examples, the sender ID may be embedded in the content based on color arrangement of a set of pixels in the message data.

In block 620, processor 512 generates a first message ID based on the message data. In some embodiments, the processor 512 generates the first message ID based on a content of the message data. In additional or alternative embodiments the message ID can be embedded in the message data. In some examples, the message ID can be an encrypted message ID and the sender ID can be an encrypted sender ID. The processor 512 can determine a decryption key based on the source of the electronic message and can decrypt the encrypted message ID and the encrypted sender ID. using the decryption key.

In block 630, processor 512 determines that the first message ID matches a second message ID stored in the database 590. In some embodiments, the processor 512 may determine that the first message ID matches the second message ID in response to the first message ID having a threshold level of similarity to the second message ID.

In block 640, processor 512 determines that the sender ID is different from an originator ID associated with the second message ID. The processor 512 can retrieve the originator ID associated with the second message ID from the database 590 and compare the originator ID with the sender ID that was embedded in the first message.

In block 650, processor 512 determines whether the originator associated with the originator ID has authorized the sender to transmit the data. In response to determining that the sender ID is different from the originator ID, the processor can notify a user associated with the originator ID that another user associated with the sender ID is attempting to transmit message data originated by the user. In some embodiments, the processor 512 determines information regarding the user based on the originator ID and transmits a notification to the user based on the information.

In block 660, processor 512 determines whether to transmit the electronic message to the intended recipient. In some embodiments, the processor 512 waits a predetermined period of time for a response from the originator to a notification message. In response to receiving approval to transmit the message data from the originator, the processor 512 can allow the electronic message to be transmitted to the intended recipient. In some embodiments, the processor 512 can store the sender ID and a recipient ID associated with the intended recipient in the database 590 as associated with the message ID. In response to receiving a rejection of approval to transmit the message data from the originator or in response to the predetermined period of time elapsing, the processor 512 can transmit a rejection notification to the user associated with the sender ID indicating the electronic message was not delivered to the intended recipient.

Figure 7:
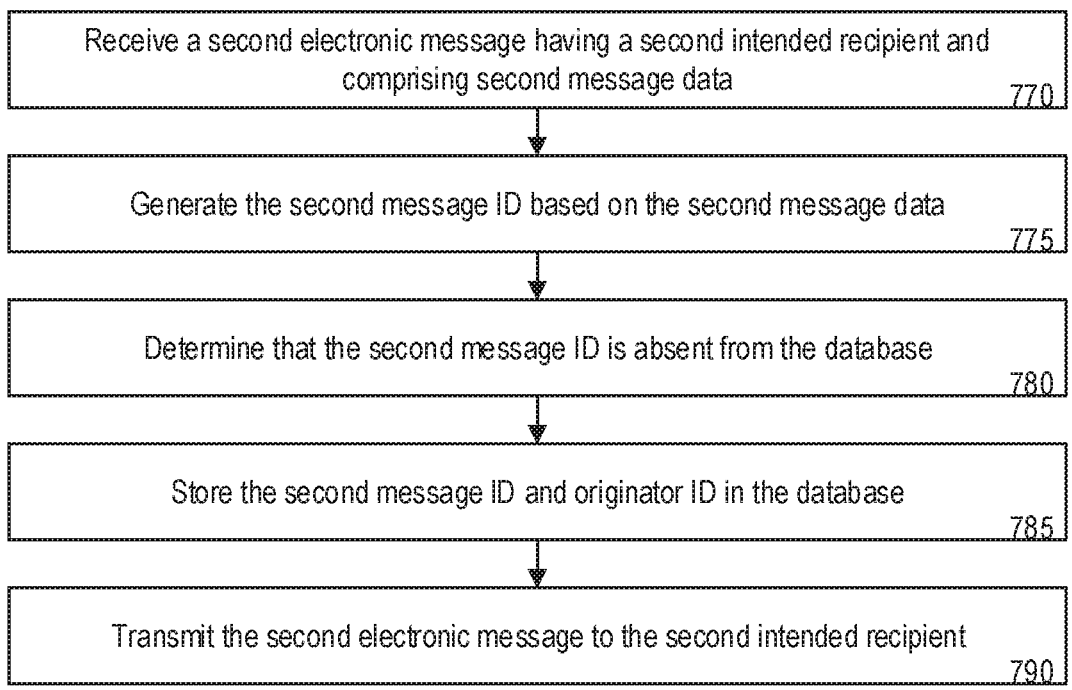
FIG. 7 is a flow chart of an example of a process for detecting that an electronic message is being transmitted by an originator of the electronic message and beginning to track and secure the message data in the electronic message in accordance with some embodiments of the present disclosure.

FIG. 7 depicts an example of a process for detecting that an electronic message is being transmitted by an originator of the electronic message and beginning to track and secure the message data in the electronic message in accordance with some embodiments of the present disclosure. In some embodiments, the operations of FIG. 5 occur prior to the operations of FIG. 4. The process is described below in regards to the authentication server 550 in FIG. 5, but other implementations are possible.

In block 770, processor 512 receives, via the communication interface 518, a second electronic message having a second intended recipient and including second message data. In block 775, processor 512 generates the second message ID based on the second message data. In some embodiments, processor 512 can generate the second message ID such that changes below a threshold level to the second message data would not affect a message ID generated from the second message data.

In block 780, processor 512 determines that the second message ID is absent from the database 590. In some embodiments, the second message data can include an embedded sender ID or user ID that can be considered an originator ID in relation to the second message data because a user associated with the originator ID is the original source of the message data, which the processor 512 can determine by determining that the second message ID is absent from the database 590.

In block 785, processor 512 stores the second message ID and the originator ID in the database 590. In some embodiments, storing the second message ID can allow the processor 512 to compare messaged IDs generated from subsequent transmissions of the second message data to the second message ID stored in the database 590 (e.g., see block 630 of FIG. 6). In additional or alternative embodiments, storing the originator ID in the database 590 can allow the processor 512 to compare sender IDs determined from subsequent transmissions of the second message data to the originator ID stored in the database 590 (e.g., see block 640 of FIG. 6).

In block 790, processor 512 transmits, via the communication interface 518, the second electronic message to the second intended recipient. In response to determining that the second message ID is absent from the database, the processor 512 can determine that the message data is not associated with another user whose permission should be requested before sending the second electronic message.

Figure 8:
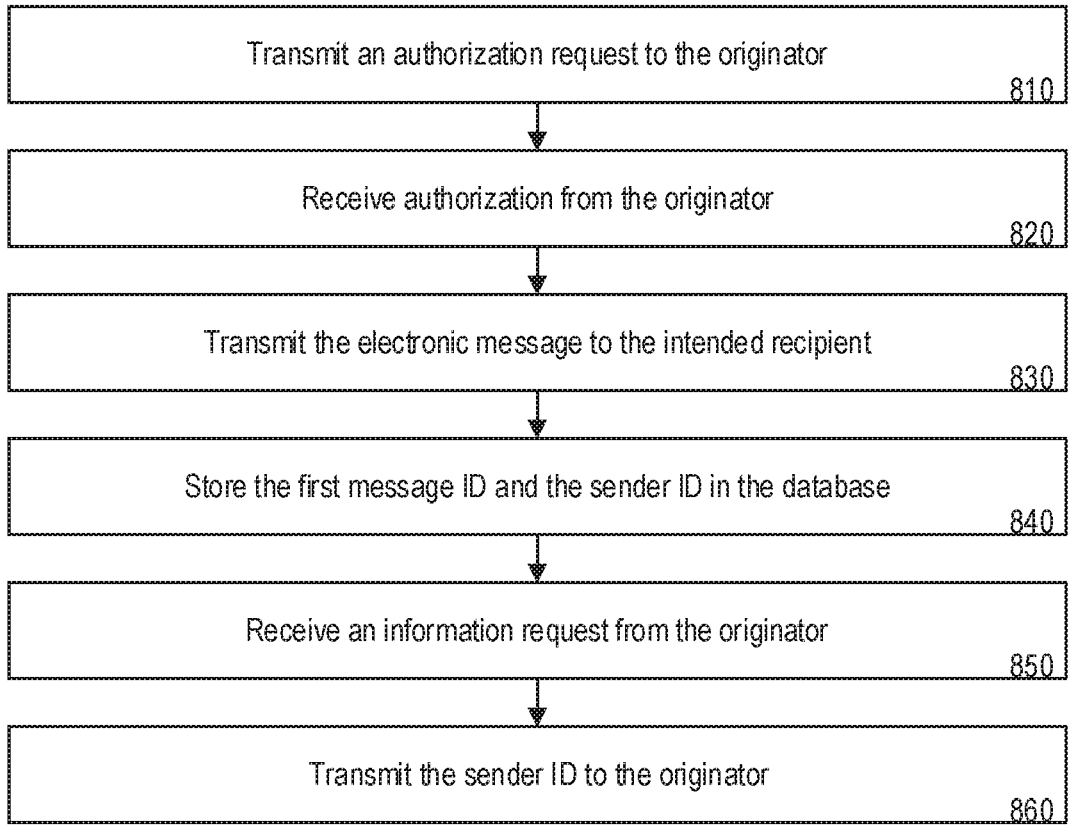
FIG. 8 is a flow chart of an example of a process for allowing electronic messages to be transmitted by a non-originator in response to authorization from the originator in accordance with some embodiments of the present disclosure.

FIG. 8 depicts an example of a process for allowing electronic messages to be transmitted by a non-originator in response to authorization from the originator in accordance with some embodiments of the present disclosure. The process is described below in regards to the authentication server 550 in FIG. 5, but other implementations are possible.

In block 810, processor 512 transmits, via communication interface 518, an authorization request to the originator. In some embodiments, processor 512 may determine to transmit the authorization request to the originator in response to determining that a user other than the originator has requested message data created by the originator be transmitted. The authorization request can include information regarding the message data, the user attempting to transmit the message data, and the intended recipients of the electronic message that includes the message data.

In block 820, processor 512 receives, via communication interface 518, authorization from the originator. In some embodiments, the authorization can indicate authorization for the message data to be transmitted as part of this electronic message. In additional or alternative embodiments, the authorization can provide future authorization for the message data to be transmitted in subsequent electronic messages.

In block 830, processor 512 transmits, via communication interface 518, the electronic message to the intended recipient. In some embodiments, the authentication server 550 transmits the electronic message. In additional or alternative embodiments, the authentication server 550 authorizes the electronic message to be transmitted to the intended recipient.

In block 840, processor 512 stores the first message ID and the sender ID in the database 590. In some embodiments, the first message ID and the sender ID in the database are stored in a tree storage structure such that the first message ID is the root node and the sender ID is a branch. Subsequent sender IDs may branch from the sender ID, which can illustrate a path of taken by the electronic message.

In block 850, processor 512 receives, via communication interface 518, an information request from the originator. In some embodiments, the information request can include the originator ID or the message ID and the processor 512 can query the database 590 using the information request.

In block 860, processor 512 transmits, via communication interface 518, the sender ID to the originator. In some embodiments, the processor 512 transmits information associated with a user associated with the sender ID to the originator. For example, the processor 512 may transmit contact information associated with the sender ID to the originator.

Figure 9:
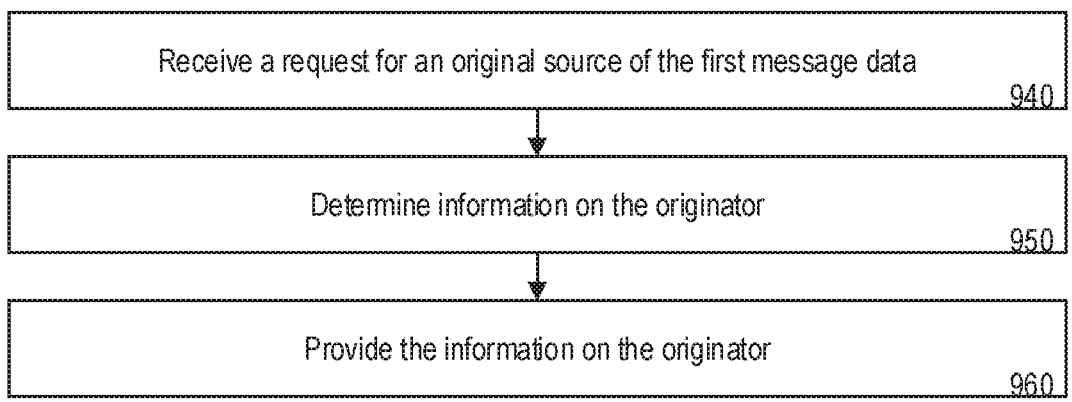
FIG. 9 is a flow chart of an example of a process for providing information on an originator of a tracked electronic message in accordance with some embodiments of the present disclosure.

FIG. 9 depicts an example of a process for providing information on an originator of a tracked electronic message in accordance with some embodiments of the present disclosure. The process is described below in regards to the authentication server 550 in FIG. 5, but other implementations are possible.

In block 940, processor 512 receives, via communication interface 518, a request for an original source of the first message data. In some embodiments, electronic messages and corresponding message data can be used by a malicious entity. For example, a malicious entity can spread malicious software or malicious information within message data. A request for the original source of the first message data can be received by a user effected by a malicious electronic message or by law enforcement. The request may include the first message data or the first message ID associated with the first message data.

In block 950, processor 512 determines information on the originator. The processor 512 can use the request to query the database 590 and determine information associated with the first message ID including the originator ID and information associated with the originator ID. In some examples, information associated with the originator ID can include contact information, account information, location information, and information on other message data originated by the originator.

In block 960, processor 512 provides the information on the originator. In some embodiments, the processor 512 transmits or displays the information on the originator in response to the request.

Figure 10:
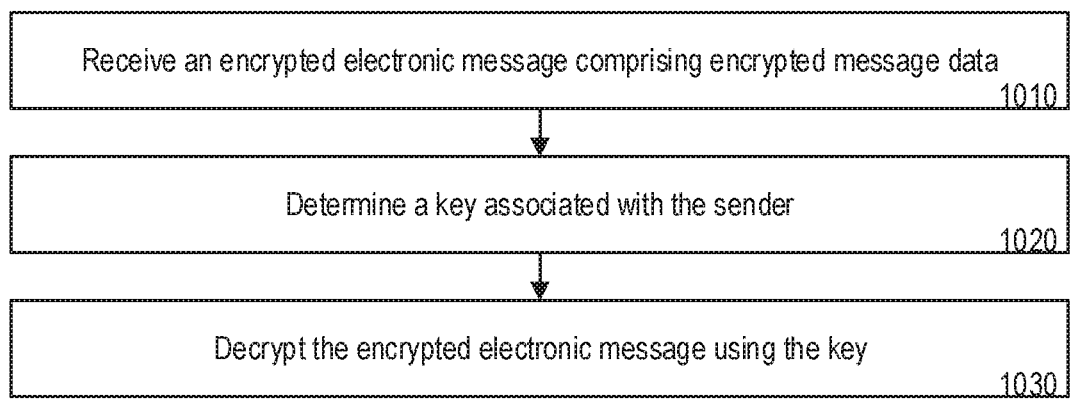
FIG. 10 is a flow chart of an example of a process for securing and tracking an encrypted electronic message in accordance with some embodiments of the present disclosure.

FIG. 10 depicts an example of a process for securing and tracking an encrypted electronic message in accordance with some embodiments of the present disclosure. The process is described below in regards to the authentication server 550 in FIG. 5, but other implementations are possible.

In block 1010, processor 512 receives, via communication interface 518, an encrypted electronic message including encrypted message data. In some embodiments, a unique ID assigned to each user can be associated with an encryption key. In some examples, a remote device transmitting a message can embed an encrypted sender ID or encrypt the message data based on a unique ID associated with a user of the remote device.

In block 1020, processor 512 determines a key associated with the sender. In some embodiments, the processor 512 can detect a source of the electronic message and retrieve a key associated with an account corresponding to the sender stored in the database 590.

In block 1030, processor 512 decrypts the encrypted electronic message using the key. In some embodiments, processor 512 can determine the message ID by decrypting the electronic message using the key. In additional or alternative embodiments, the message ID and the sender ID may be encrypted and embedded in the message ID. The processor 512 may use the key to decrypt the encrypted message ID and the encrypted sender ID.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method for tracking and securing electronic messages, the method comprising:
   receiving, by a communication interface of an authentication server, an electronic message transmitted by a sender, the electronic message having an intended recipient and comprising message data, wherein a sender identification ("ID") is embedded in the message data;
   generating, by a processing circuit of the authentication server, a first message ID based on the message data that includes the sender ID embedded therein;

determining, by the processing circuit of the authentication server, that the first message ID matches a second message ID that is stored in a database;

determining, by the processing circuit of the authentication server, that the sender ID is different from an originator ID that is associated with the second message ID in the database;

determining, by the processing circuit of the authentication server, whether an originator associated with the originator ID has authorized the sender to transmit the message data;

determining, by the processing circuit of the authentication server, whether to transmit the electronic message to the intended recipient based on whether the originator has authorized the sender to transmit the message data, wherein determining whether the originator authorized the sender to transmit the message data comprises:

transmitting an authorization request to the originator in response to determining that the sender ID is different from the originator ID; and receiving authorization from the originator in response to transmitting the authorization request, wherein determining whether to transmit the electronic message further comprises transmitting the electronic message to the intended recipient in response to receiving authorization from the originator, receiving, a second electronic message transmitted by the originator, the second electronic message having a second intended recipient and comprising second message data, wherein receiving authorization from the originator comprises receiving future authorization indicating the sender is authorized by the originator to retransmit the second message data in subsequent electronic messages, the method further comprising storing the sender ID in the database as an authorized user associated with the second message ID.

2. The method of claim 1, wherein the electronic message is a first electronic message having a first intended recipient and comprising first message data, the method further comprising:

receiving, prior to the first electronic message, a second electronic message transmitted by the originator, the second electronic message having a second intended recipient and comprising second message data, wherein the originator ID is embedded in the second message data;

generating the second message ID based on the second message data;

determining that the second message ID is absent from the database;

storing the second message ID and the originator ID in the database; and transmitting the second electronic message to the second intended recipient.

3. The method of claim 2, wherein storing the second message ID and the originator ID in the database further comprises storing the second message data in the database, wherein determining whether the originator has authorized the sender to transmit the first message data further comprises:

determining that the first message data is different than the second message data; and transmitting a notification to the originator indicating that the first electronic message includes different message data than the second electronic message.

4. The method of claim 2, further comprising:

responsive to determining that the second message ID is absent from the database, determining the originator ID from the first message data; and comparing the originator ID from the first electronic message with a second sender ID of a second sender of the second electronic message, wherein storing the second message ID and originator ID in the database is in response to determining that the originator ID from the first electronic message matches the second sender ID.

5. The method of claim 1, wherein determining whether to transmit the electronic message comprises determining that the sender is unauthorized to transmit the message data, and wherein the method further comprises notifying the sender that the electronic message was not delivered to the intended recipient.

6. The method of claim 1, further comprising:

storing the first message ID and the sender ID in the database;

receiving an information request from the originator for information on entities that have retransmitted the second message data; and transmitting the sender ID to the originator in response to receiving the information request.

7. The method of claim 1, further comprising:

receiving a request for an original source of the first message data in the first electronic message;

determining information on the originator based on the originator ID; and providing the information on the originator.

8. The method of claim 1, wherein receiving the electronic message further comprises:

receiving an encrypted electronic message comprising encrypted message data;

determining a key associated with the sender; and decrypting the encrypted electronic message using the key to determine the electronic message and the encrypted message data to determine the sender ID and message ID.

9. A system for tracking and securing electronic messages, the system comprising:

a communication interface for receiving and transmitting an electronic message via a telecommunications network;

a database for storing a message ID with an associated originator ID, the message ID being a unique identifier of the electronic message and the originator ID being a unique identifier of a source of message data in the electronic message;

a processing circuit; and memory having instructions stored therein that are executable by the processing circuit for causing the processing circuit to:

receive, via the communication interface, the electronic message transmitted by a sender, the electronic message having an intended recipient and comprising first message data, wherein a sender ID is embedded in the first message data;

generate a first message ID based on the first message data;

determine that the first message ID matches a second message ID stored in the database;

determine that the sender ID is different from an originator ID associated with the second message ID;

determine whether an originator associated with the originator ID authorized the sender to transmit the message data; and determine whether to transmit the electronic message to the recipient based on whether the originator authorized the sender to transmit the first message data, wherein determining whether the originator authorized the sender to transmit the first message data further comprises:

transmitting an authorization request to the originator in response to determining that the sender ID is different from the originator ID; and receiving authorization from the originator in response to transmitting the authorization request, wherein determining whether to transmit the electronic message further comprises transmitting the electronic message to the intended recipient in response to receiving authorization from the originator, receiving, a second electronic message transmitted by the originator, the second electronic message having a second intended recipient and comprising second message data, wherein receiving authorization from the originator further comprises receiving future authorization indicating the sender is authorized by the originator to retransmit the second message data in subsequent electronic messages, and storing the sender ID in the database as an authorized user associated with the second message data.

10. The system of claim 9, wherein the electronic message is a first electronic message having a first intended recipient and comprising first message data, the instructions further executable for causing the processing circuit to:

receive a second electronic message prior to the first electronic message, the second electronic message transmitted by the originator having a second intended recipient and comprising second message data, wherein the originator ID is embedded in the second message data;

generate the second message ID based on the second message data;

determine that the second message ID is absent from the database;

store the second message ID and the originator ID in the database; and transmit the second electronic message to the second intended recipient.

11. The system of claim 10, wherein the instructions for causing the processing circuit to store the second message ID and the originator ID in the database are further executable for causing the processing circuit to store the second message data in the database, wherein instructions for causing the processing circuit to determine whether the originator has authorized the sender to transmit the first message data are further executable for causing the processing circuit to:

determine that the first message data is different than the second message data; and transmit a notification to the originator indicating that the first electronic message includes different message data than the second electronic message.

12. The system of claim 10, wherein the instructions are further executable for causing the processing circuit to:

responsive to determining that the second message ID is absent from the database, determine the originator ID from the message data; and compare the originator ID from the first electronic message with a second sender ID of a second sender of the second electronic message, wherein instructions for causing the processing circuit to store the second message ID and originator ID in the database are executable in response to determining the originator ID from the first electronic message matches the second sender ID.

13. The system of claim 9, wherein the instructions for causing the processing circuit to determine whether to transmit the electronic message further cause the processing circuit to determine that the sender is unauthorized to transmit the message data, wherein the instructions are further executable for causing the processing circuit to notify the sender that the electronic message was not delivered to the intended recipient.

14. The system of claim 9, wherein the instructions are further executable for causing the processing circuit to:

store the first message ID and sender ID in the database;

receive an information request from the originator for information on entities that have retransmitted the second message data; and transmit the sender ID to the originator in response to receiving the information request.

15. The system of claim 9, wherein the instructions are further executable for causing the processing circuit to:

receive a request for an original source of the first message data in the first electronic message;

determine information on the originator based on the originator ID; and provide the information on the originator.

16. A computer program product for tracking and securing electronic messages, the computer program product comprising non-transitory computer readable medium storing program code configured to be executed by a processing circuit to perform operations comprising:

receiving a first electronic message transmitted by an originator, the first electronic message having a first intended recipient and comprising first message data, wherein an originator ID is embedded in the first message data;

generating a first message ID based on the first message data;

searching a database for the first message ID;

responsive to the first message ID being absent from the database:

storing the first message ID and the originator ID in the database; and transmitting the first electronic message to the first intended recipient;

receiving a second electronic message transmitted by a sender, the second electronic message having a second intended recipient and comprising second message data, wherein a sender ID is embedded in the second message data;

generating a second message ID based on the second message data;

searching the database for the second message ID; and responsive to the second message ID matching the first message ID in the database, comparing the sender ID with the originator ID and either:

transmitting the second electronic message to the second intended recipient based on the originator ID matching the sender ID; or determining whether to transmit the second electronic message to the second intended recipient based on whether the sender has authorization from the originator to retransmit the first message data, wherein determining whether the originator authorized the sender to transmit the first message data comprises:
transmitting an authorization request to the originator in response to determining that the sender ID is different from the originator ID; and
receiving authorization from the originator in response to transmitting the authorization request,
wherein determining whether to transmit the electronic message further comprises transmitting the electronic message to the intended recipient in response to receiving authorization from the originator,
wherein receiving authorization from the originator comprises receiving future authorization indicating the sender is authorized by the originator to retransmit the second message data in subsequent electronic messages, and storing the sender ID in the database as an authorized user associated with the second message ID.

\* \* \* \* \*